(12) United States Patent
Linden et al.

(10) Patent No.: US 6,357,837 B1
(45) Date of Patent: Mar. 19, 2002

(54) ELECTRONICALLY CONTROLLABLE BRAKE BOOSTER

(75) Inventors: Christoph Linden, Vallendar; Gregor Godlewsky, Bendorf; Lorenz Maack, Stuttgart, all of (DE)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/540,736

(22) Filed: Mar. 31, 2000

Related U.S. Application Data

(63) Continuation of application No. PCT/EP98/06220, filed on Sep. 30, 1998.

(30) Foreign Application Priority Data

Oct. 6, 1997 (DE) .......................................... 197 44 053

(51) Int. Cl.⁷ ................................................. B60T 8/44
(52) U.S. Cl. ................................ 303/114.3; 303/113.4; 303/156; 303/115.2
(58) Field of Search .......................... 303/113.3, 113.4, 303/114.1, 114.2, 114.3, 156, 115.1, 115.2, 115.3

(56) References Cited

U.S. PATENT DOCUMENTS

| RE31,383 E | * | 9/1983 | Leiber et al. ................ 364/426 |
|---|---|---|---|
| 5,505,526 A | * | 4/1996 | Michels |
| 5,538,337 A | * | 7/1996 | Harris .......................... 303/156 |
| 5,711,204 A | * | 1/1998 | Michels |
| 5,725,291 A | * | 3/1998 | Michels |
| 5,816,667 A | * | 10/1998 | Jokic |

(List continued on next page.)

FOREIGN PATENT DOCUMENTS

| DE | 196 12 952 A1 | | 4/1996 |
|---|---|---|---|
| DE | 195 27 493 A1 | | 1/1997 |
| EP | 0 706 924 A1 | * | 4/1996 |
| EP | 0 800 976 A1 | * | 10/1997 |
| WO | WO 93/24353 | * | 12/1993 |
| WO | WO 95/03196 | * | 2/1995 |
| WO | WO 96/06763 | * | 3/1996 |

*Primary Examiner*—Robert J. Oberleitner
*Assistant Examiner*—Benjamin A. Pezzlo
(74) *Attorney, Agent, or Firm*—MacMillan, Sobanski & Todd, LLC

(57) ABSTRACT

The invention relates to an electronically controllable brake booster with a vacuum chamber and a pressure chamber, which are separated from each other by a movable wall, a control valve arrangement which can be actuated by means of an electromagnetic actuation means, and by means of which a pressure difference between the pressure chamber and the vacuum chamber can be adjusted, with the control valve arrangement, as a function of a current flowing through the electromagnetic actuation means, assuming a holding position in which the current ranges between a higher value and a lower value without the control valve arrangement leaving the holding position, a first pressure changing position in which the current is higher than the higher value, and a second pressure changing position in which the current is lower than the low value, characterized in that upon a changeover of the control valve arrangement from the holding position into the first or the second pressure changing position, or upon a changeover from the first or the second pressure changing position into the holding position, the time period is determined which is required for the changeover, the determined time period is compared with a predetermined time interval in order to determine whether the changeover has taken place within this predetermined time interval, and the higher and/or lower current value defining the holding position is modified for future changeovers if the determined time period exceeds the predetermined time interval.

7 Claims, 4 Drawing Sheets

U.S. PATENT DOCUMENTS

| | | | | |
|---|---|---|---|---|
| 5,836,659 A | * | 11/1998 | Feigel et al. | 303/115.2 |
| 5,855,420 A | * | 1/1999 | Lawrence | 303/113.4 |
| 5,924,508 A | * | 7/1999 | Clauss et al. | 180/179 |
| 5,948,036 A | * | 9/1999 | Okubo | 701/78 |
| 5,969,443 A | * | 10/1999 | Linden et al. | |
| 6,033,037 A | * | 3/2000 | Eckert | 303/114.3 |
| 6,033,039 A | * | 3/2000 | Dieringer et al. | 303/114.3 |
| 6,185,498 B1 | * | 2/2001 | Linden et al. | 701/70 |
| 6,186,601 B1 | * | 2/2001 | Linden et al. | 303/113.1 |

* cited by examiner

ELECTRONICALLY CONTROLLABLE BRAKE BOOSTER

CROSS REFERENCE TO RELATED APPLICATIONS

This application is a continuation of International Application No. PCT/EP98/06220 filed Sep. 30, 1998, which claims priority to German Patent Application No. 19744053.3 filed Oct. 6, 1997.

BACKGROUND OF THE INVENTION

The present invention relates to an electronically controllable brake booster. In particular, the present invention relates to an electronically controllable brake booster with a vacuum chamber and a pressure chamber, which are separated from each other by a movable wall, a control valve arrangement which can be actuated by means of an electromagnetic actuation means, and by means of which a pressure difference between the pressure chamber and the vacuum chamber can be adjusted, with the control valve arrangement, as a function of a current flowing through the electromagnetic actuation means, assuming a holding position in which the current ranges between a higher value and a lower value without the control valve arrangement leaving its holding position, a first pressure changing position in which the current is higher than the higher value, and a second pressure changing position in which the current is lower than the low value.

From DE 195 27 493 A1 an electromagnetic actuation means is known which comprises a solenoid coil which can be subjected to a control current and an armature which is associated with the solenoid coil and which is adapted to perform movements which are a function of a control current flowing through the solenoid coil and a spring arrangement which biases the armature in the opposite direction. Therein, a holding position is defined as a manipulated variable, which the armature assumes at a holding current through the solenoid coil. This holding current flowing through the solenoid coil can be changed to a higher value or to a lower value without the armature leaving the holding position.

In addition, both the higher and the lower current value are dimensioned in such a manner that interfering influences on the magnetic and spring forces actuating the armature do not bring the armature into an actuated position which differs from the holding position.

For this purpose, the higher current value is determined in such a manner that a value which is related to the position of the armature in the holding position is determined; the control current is increased by a predetermined current step in a stepwise manner and output as a manipulated variable to the solenoid coil of the electromagnetic actuation means, until the value which is related to the position of the armature in the holding position changes by a predetermined value towards the second actuated position.

The lower current value is determined in such a manner that a value which is related to the position of the armature in the holding position is determined; the control current is decreased by a predetermined current step in a stepwise manner, and output as a manipulated variable to the solenoid coil of the electromagnetic actuation means, until the value which is related to the position of the armature in the holding position changes by a predetermined value towards the first actuated position.

From this document is it also known that the control valve arrangement can reliably be brought into the holding position if the arithmetic mean value of the currents is selected for the holding current.

However, the "Learning of the working points" covered in DE 195 27 493 A1 is limited in that the decisive currents for the lower limit and the upper limit must be learned and stored at each commencement of a trip upon switching on the ignition or in periodic time intervals during driving.

Upon controlling the control valve arrangement, the currents which have been learned in this manner are used for specifying the first manipulated variable in order to achieve an adequate control behaviour.

In addition, the pressure difference acting upon the movable wall of the brake booster, which can be adjusted to different values depending upon the desired control, is not considered quantitatively. The pressure difference adjusted at the movable wall is also acting immediately upon the valve body, the valve seat, and the valve element, which also leads to a shift of the currents for the lower limit and for the upper limit.

SUMMARY OF THE INVENTION

The invention, the invention deals with the problem which results from the shift of the upper and lower current values that are necessary in order to retain the control valve arrangement in its holding position.

It is the object of the present invention to eliminate this disadvantage so that the control behaviour is further improved.

As a solution, the invention proposes that with the initially mentioned electronically controllable brake booster, upon a changeover of the control valve arrangement from the holding position into the first or the second pressure changing position, or upon a changeover from the first or the second pressure changing position into the holding position, the time required for the changeover is determined, the determined time is compared with a predetermined time interval in order to verify whether the changeover has taken place within said pre-determined time interval, and the higher and/or lower current value $I_{AUFBAU\_NEU}$, $I_{ABBAU\_NEU}$ defining the holding position is modified for future changeovers if the determined time exceeds the predetermined time interval.

Further configuration and variation possibilities are characterised in the dependent claims.

Further properties, advantages, characteristics, and variation possibilities of the invention will be explained by means of the following description of a current preferred embodiment of the invention with reference to the drawings.

DETAILED DESCRIPTION OF THE INVENTION

Figure 1:
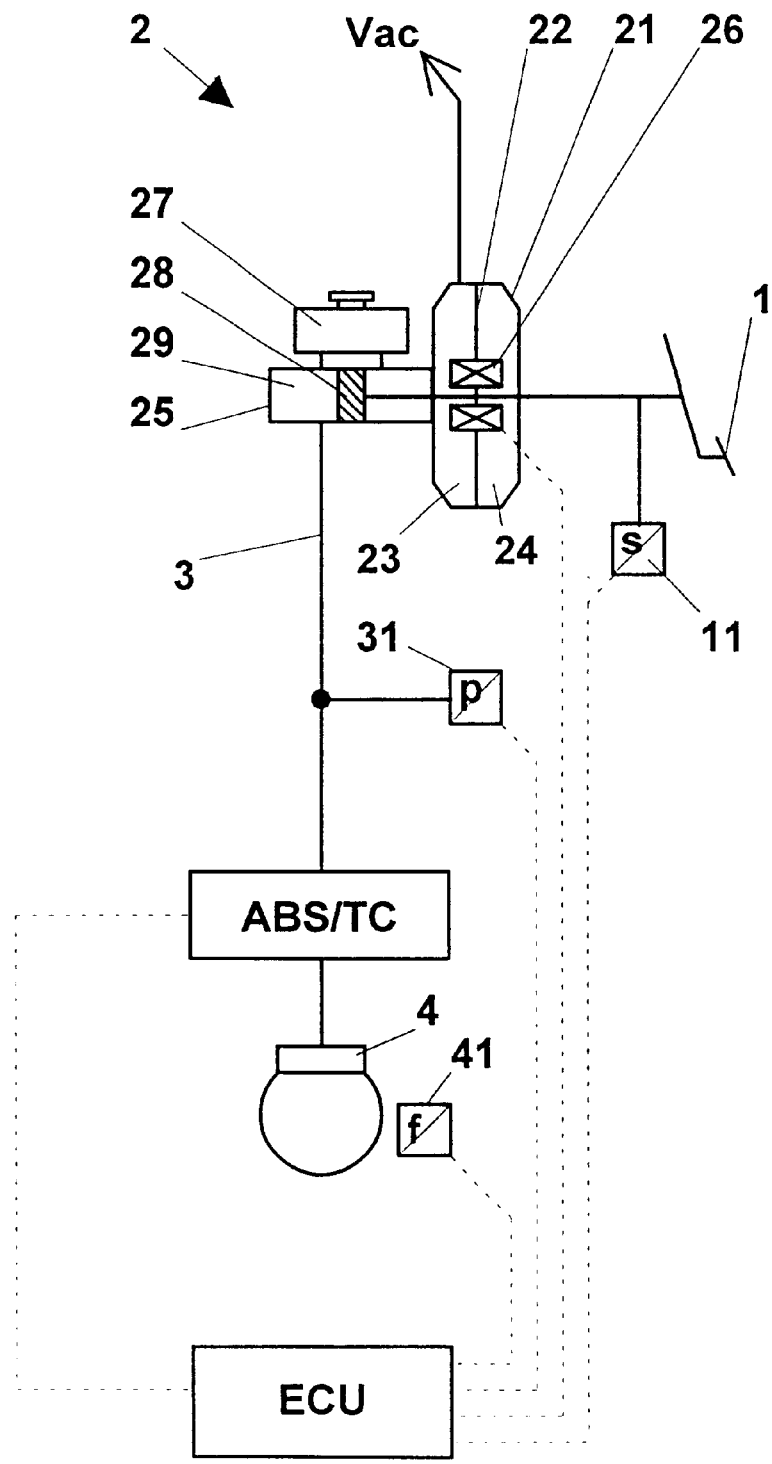
FIG. 1 schematically shows a vehicle brake system with an electronically controllable brake booster.

In the vehicle brake system which is schematically shown in FIG. 1, a brake pedal 1 is used to actuate a brake pressure generator unit 2 via an actuating element. The brake pressure generator unit 2 comprises a brake cylinder 25 in which a piston 28 defines a pressure chamber 29. The pressure chamber 29 is supplied with brake fluid from a reservoir 27. A brake line 3 leads from the pressure chamber 29 to a wheel brake 4 of the vehicle.

An anti-blocking control means and/or a traction control means ABS/TC are arranged in the brake line 3 between the brake pressure generator unit 2 and the wheel brake 4. The anti-blocking and/or traction control means ABS/TC comprises i.a. valve and pump arrangements in a known manner which are driven by an electronic control unit ECU in order to modulate the pressure in the wheel brake 4. This occurs as a function of the rotational behaviour of a vehicle wheel associated with the wheel brake 4, which is sensed by means of a sensor 41 and supplied to the electronic control unit ECU.

The brake pressure generator unit 2 comprises a brake booster 21 for the amplification of the actuation force which is introduced by the driver via the brake pedal 1. A movable wall 22 divides the brake booster 21 into a vacuum chamber 23 and a pressure chamber 24. For the generation of the vacuum, the vacuum chamber is connected to a vacuum source Vac which is not shown in detail. In a vehicle which is equipped with an Otto engine, the vacuum which is inherently produced in the intake tube, is available. However, in a vehicle which is powered by a Diesel engine or an electric motor, an additional vacuum pump is required as the vacuum source Vac. Upon an actuation of the brake pedal 1, the brake booster functions in a known manner in that the pressure chamber 24 is subjected to atmospheric pressure so that a pressure difference is acting on the movable wall 22, which assists the actuation force introduced at the brake pedal 1. In the non-actuated condition the vacuum chamber 23 and the pressure chamber 24 are connected with each other and thus pressure compensated so that no pressure difference is effective at the movable wall 22.

The brake booster 21 is also electronically controllable via a solenoid arrangement 26. The electronic controllability of the brake booster 21 makes it possible to carry out braking operations also automatically, i.e. independent of an actuation of the brake pedal 1. This can be utilised, for example, for the realisation of a traction control, driving dynamics control, or vehicle-to-vehicle ranging control. A sensor means 11 is provided in order to sense parameters which are related to the actuation of the brake pedal 1, such as, for example, pedal travel, pedal force, or pedal actuation speed for the evaluation in the electronic control unit ECU, in order to also carry out braking operations in emergency situations, with, for example, exceeding a certain pedal actuation speed serving as the criterion.

For this purpose, the solenoid arrangement 26 actuates a control valve which is not shown in detail herein, in order to bring the brake booster 21 into different control positions (I,. II., III.):

into a first so-called "build-up" position (I.) in which the connection of the vacuum chamber 23 with the pressure chamber 24 is blocked, and the connection of the pressure chamber 24 with atmosphere is open so that a pressure difference at the movable wall 22 is built up or increased, respectively, or into a second so-called "holding position" (II.) in which the connection of the vacuum chamber 23 with the pressure chamber 24 and the connection of the pressure chamber 24 with atmosphere are blocked so that a pressure difference acting on the movable wall is maintained, or into a so-called "relief position" (III.) in which the connection of the vacuum chamber 23 with the pressure chamber 24 is open, and the connection of the pressure chamber 24 with atmosphere is blocked so that a pressure difference acting on the movable wall 22 is relieved via a pressure compensation process.

In order to bring the control valve for a modulation of the pressure difference at the movable wall 22 into the different control positions (I., II., III.) the electronic control unit ECU supplies a control current $I_{SOLL}$ to the solenoid arrangement 26, with the variation of the control current $I_{SOLL}$ being effected, for example, by means of pulse width modulation. A magnetic force is acting on the armature of the solenoid arrangement 26, which causes a positioning of the armature, according to which, the control positions (I., II., III.) result.

The brake pressure $P_{IST}$ which is generated in the pressure chamber 29 of the brake cylinder 25 and introduced into the brake line 3 is sensed by means of a sensor 31 and transmitted to the electronic control unit ECU in order to control the brake pressure $P_{IST}$ as a function of the desired pressure value and/or the pressure characteristic $P_{SOLL}$ by adjusting the control current $I_{SOLL}$ which is supplied to the solenoid arrangement 26.

Figure 2:
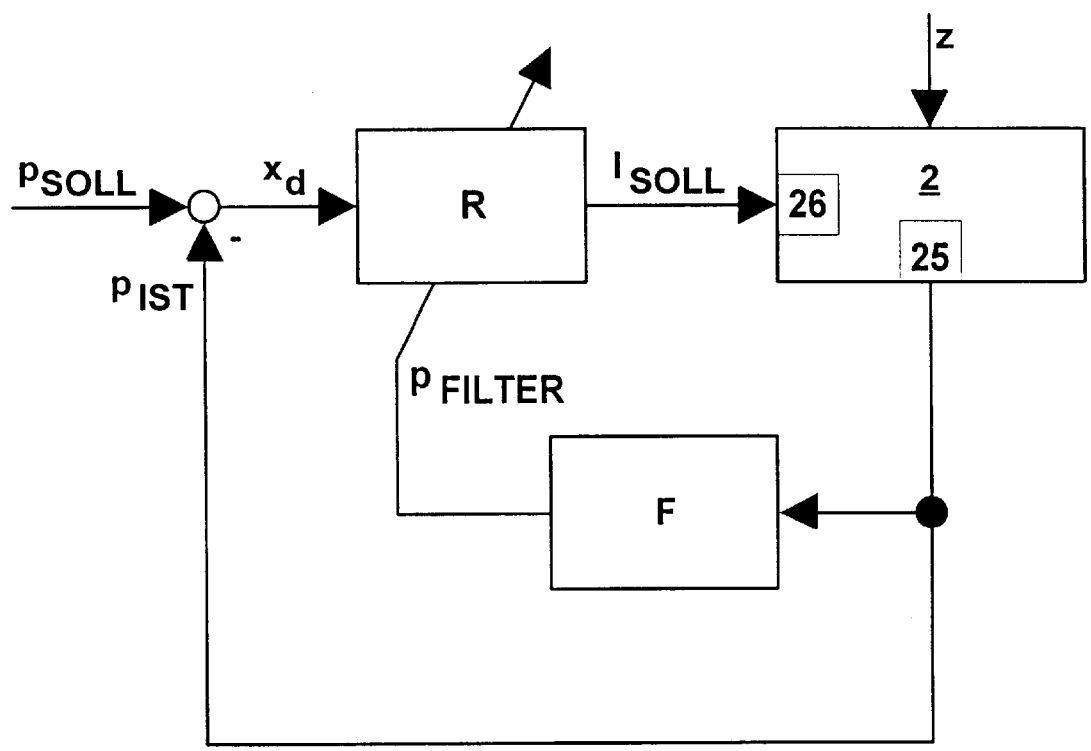
FIG. 2 schematically shows a simple control loop for the operation of an electronically controllable brake booster.

The operation of the electronically controllable brake booster 21 in a closed control loop is shown in FIG. 2. A controlled variable, the brake pressure $P_{IST}$ generated in the brake cylinder 25, which originates from the controlled system, the brake pressure generator unit 2, is continuously sensed and compared with a reference variable, the desired pressure characteristic $P_{SOLL}$. The result of this comparison is a standard deviation $x_d$ which is supplied to a controlling means R, whereby the controlling means R can be part of the electronic control unit ECU. The manipulated variable which originates from the controlling means R is the control current $I_{SOLL}$ which is supplied to the solenoid arrangement 26. The interfering variables z are mainly influences caused by friction losses, tolerances, temperature variations, or variations of external reaction forces which, in particular, include variations of the pressure force component in the vacuum chamber 23 of the brake booster 21.

Figure 3:
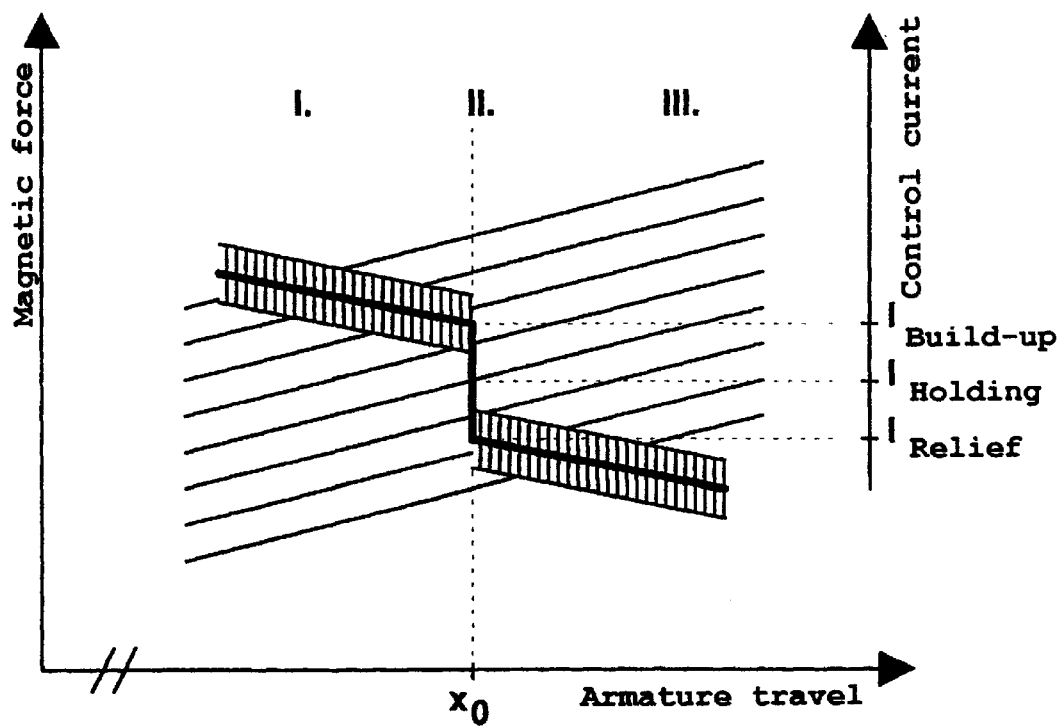
FIG. 3 shows a schematic diagram for explaining the control characteristic of an electronically controllable brake booster.

In the diagram according to FIG. 3, the travel is plotted over the abscissa and the magnetic force which acts on the armature and which results as a function of the control current $I_{SOLL}$ is plotted over the ordinate. This is an idealised schematic representation which relates to a working range which is designed in such a manner that a proportional relationship exists between magnetic force and control current. In addition, the control characteristic of the electronically controllable brake booster 21 is entered. This control characteristic comprises a total of three branches. For the vertical branch, a current range $I_{ABBAU} < I_{SOLL} < I_{AUFBAU}$ is associated with a certain armature position x0, with the position x0 exactly corresponding to the holding position (II.). The inclined branch extending to the left from the vertical branch applies to a current $I_{SOLL} > I_{AUFBAU}$ and represents the build-up position (I.), while the inclined branch extending to the right of the vertical branch applies to a current $I_{SOLL} < I_{ABBAU}$ and characterises the relief position (III).

Due to the already mentioned interfering influences which are caused by friction, tolerances, reaction forces, etc. the control characteristic in the area of the inclined branches has a scatter band, which leads to a shift of the working points $I_{ABBAU}$ and $I_{AUFBAU}$. Under practical conditions it has been found that with incorrectly adjusted working points $I_{AUFBAU}$ or $I_{ABBAU}$, respectively, a typical oscillation occurs, the frequency of which lies in the order of 7 Hz and which is super-imposed on the signal $P_{IST}$ representing the brake pressure. As shown in FIG. 2, a bandpass filter F is provided for the detection of the oscillation frequency $f_{TYP}$, which has a centre frequency in the order of the typical oscillation frequency $f_{TYP}$. The input side of the bandpass filter F is supplied with the signal $P_{IST}$. Due to bandpass filtering, a periodic (sinus-oidal) signal $P_{FILTER}$ results at the output side which, contrary to the signal $P_{IST}$, does not comprise direct components and therefore, if provided, represents exactly the typical oscillation. If no typical oscillation occurs, i.e. if the working points $I_{AUFBAU}$ or $I_{ABBAU}$, respectively, are correctly adjusted, the signal $P_{FILTER}$ equals (almost) zero. The signal $P_{FILTER}$ is supplied to the controlling means R in order to adjust the control current $I_{SOLL}$ to the correct working points $I_{AUFBAU}$ or $I_{ABBAU}$, respectively.

In order to counteract this problem which results from the shift of the working points $I_{AUFBAU}$ or $I_{ABBAU}$, respectively, with respect to the holding position (II.), a current is preferably adjusted for $I_{HALT}$, which results as the arithmetic mean value of the currents $I_{ABBAU}$ and $I_{AUFBAU}$. This and in particular a method for learning the currents $I_{ABBAU}$ and $I_{AUFBAU}$ which determine the working points $I_{ABBAU}$ and $I_{AUFBAU}$ is known from DE 195 27 493 A1.

Disadvantageously, the method covered in DE 195 27 493 A1 is restricted to learning and storing the currents $I_{ABBAU}$ and $I_{AUFBAU}$ merely at each commencement of a trip upon switching on the ignition or in periodic time intervals during driving, provided there is no control request for the electronically controllable brake booster 21. When there is a control request for the electronically controllable brake booster 21, the current values which have been learned in this way are used in each changeover from the holding position (II.) into the relief position (III.) as well as in each changeover from the holding position (II.) into the build-up position (I.) for specifying the first manipulated variable, in order to achieve an adequate control behaviour. If, by the above mentioned interfering influences, a shift of the working points $I_{ABBAU}$ and $I_{AUFBAU}$ is caused during the time period for which a control request for the electronically controllable brake booster 21 is applied, a sluggish control behaviour can result at each changeover from the holding position (II.) into the relief position (III.) or into the build-up position (I.), respectively, so that the performance of the electrically controllable brake booster 21 as a whole deteriorates. This is true in particular in that case in which the control request for the electronically controllable brake booster 21 is applied for a relatively long time, which can certainly be the case when performing a traction control, a driving dynamics control, or a vehicle-to-vehicle ranging control.

In principle, the inventive method is based on determining the time period from the start of the cycle until the time at which the control valve arrangement of the electronically controllable brake booster has actually assumed the build-up position (I.) and/or the relief position (III.) during a control at each cycle in which, starting from the holding position (II.) the build-up position (I.) and/or, starting from the holding position (II.) the relief position (III.) is assumed, in order to determine whether the changeover from the holding position (II.) into the build-up position (I.) and/or the changeover from the holding position (II.) into the relief position (III.) has taken place within a predetermined time period. If this is not the case, then an adjustment of the higher and/or lower current value $I_{AUFBAU,NEU}$, $I_{ABBAU,NEU}$ defining the holding position (II.) is made in that manner that the higher current value $I_{AUFBAU,NEU}$ defining the holding position (II.) is increased and/or the lower current value $I_{ABBAU,NEU}$ defining the holding position (II.) is reduced.

The term "control" or "control phase" relates to the time period during which a control request for the electronically controllable brake booster 21 is present, and the term "cycle" relates to the adjustment of a build-up, holding, or relief position (I., II., III.) for the purpose of modulating the pressure difference at the movable wall 22 within a "control".

Figure 4:
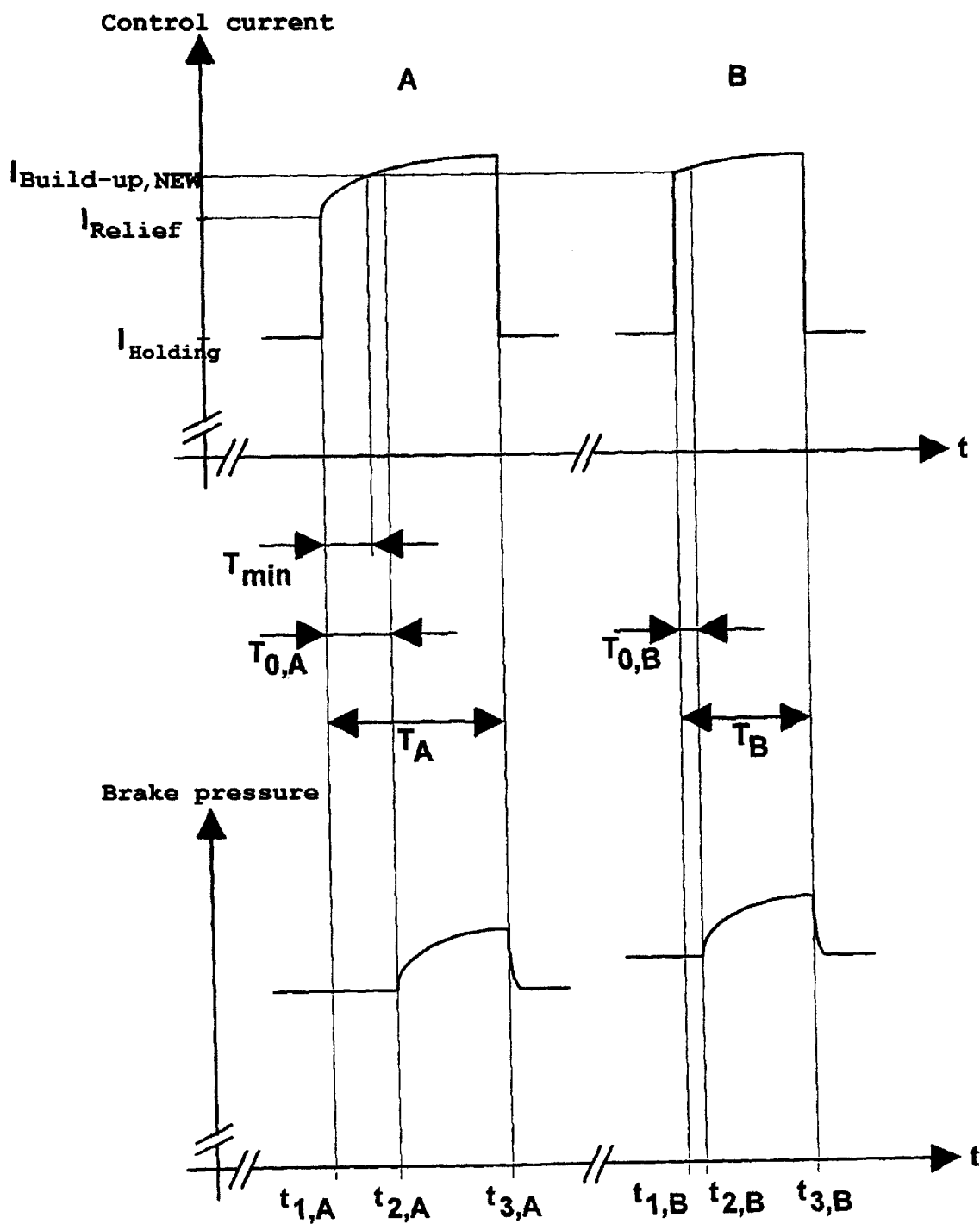
FIG. 4 schematically shows two timing diagrams for the explanation of the inventive approach.

Advantages and configuration possibilities will be explained in the following with reference to an embodiment. For this purpose, two timing diagrams are schematically shown in FIG. 4, with the control current $I_{SOLL}$ supplied to the solenoid arrangement being plotted in the upper timing diagram and the brake pressure $P_{IST}$ generated in the brake cylinder 25 being plotted in the lower timing diagram, each over the same time scale t.

The embodiment shows two successive build-up cycles (A, B), wherein the build-up position (I.), starting from the holding position (II.) is assumed. At each start of the cycle (t1,A, t1,B) the control current is abruptly increased from $I_{HALT}$ to $I_{AUFBAU}$ or $I_{AUFBAU,NEU}$, respectively, in order to specify $I_{AUFBAU}$ or $I_{AUFBAU,NEU}$, respectively, as the first manipulated variable. Thereupon, a control algorithm is executed, according to which the brake pressure is adjusted. The actual control operation is described in detail in DE 195 27 493 A1 so that a detailed explanation can be dispensed with herein. The build-up cycles (A, B) each are terminated by abruptly resetting the control current to $I_{HALT}$ at the end of the cycle (t3,A, t3,B).

As follows from the previous build-up cycle (A), after the start of the cycle (t1,A) a change of the brake pressure—here in the sense of an increase—begins only relatively late (t2,A), so that accordingly the desired change of the brake pressure begins delayed by the time period T0,A.

In the subsequent build-up cycle (B), at the start of the cycle (t1,B), the control current is abruptly increased to a higher value $I_{AUFBAU,NEU}$ instead of to $I_{AUFBAU}$ as the first manipulated variable. For this reason, the desired change of the brake pressure begins already at an earlier time (t2,B) than in the previous build-up cycle (A). Thus, the desired change of the brake pressure is delayed by only the time period T0,B, with: T0,B<T0,A.

The adjustment of the higher current value defining the holding position from $I_{AUFBAU}$ to $I_{AUFBAU,NEU}$ already takes place during the previous build-up cycle (A). For this purpose, a time determination is started at the start of the cycle (t1,A) in order to determine the time (t2,A) in which the control valve arrangement actually assumes the build-up position (I). In order to determine when the control valve arrangement actually assumes the build-up position (I.), the brake pressure is monitored for a change—or in other word: the delay time T0,A is determined. The delay time T0,A determined in this manner is now compared with a predetermined time period $T_{MIN}$. In the case that T0,A<$T_{MIN}$, the current value $I_{AUFBAU}$ is not adjusted for the following build-up cycle (B). Otherwise, if T0,A>$T_{MIN}$, an adjustment of the current value $I_{AUFBAU}$ is made for the following build-up cycle (B) to a higher current value $I_{AUFBAU,NEU}$ which is then specified as the first manipulated variable.

For the following build-up cycle (B) the current value $I_{AUFBAU,NEU}$ is preferably set to that current value which was adjusted in the previous build-up cycle (A) at the elapse of the predetermined time period $T_{MIN}$.

From FIG. 4 it can be seen that by adjusting the current value, the time period $T_B$ of the following build-up cycle (B) is considerably reduced compared to the time period $T_A$ of the previous build-up cycle. On the one hand, this improves the control dynamics, and on the other hand, a less sluggish response behaviour of the control valve arrangement is obtained so that the brake pressure can be controlled more precisely as well.

The adjustment of the lower current value defining the holding position from $I_{ABBAU}$ to $I_{ABBAU,NEU}$ takes place analogously, with the current value $I_{ABBAU}$ being set to a lower current value $I_{ABBAU,NEU}$ during the previous relief cycle, if the predetermined time period $T_{MIN}$ is exceeded, so that a further explanation can be omitted herein.

The further processing of the higher or lower, respectively, new current values $I_{AUFBAU,NEU}$, $I_{ABBAU,NEU}$ defining the holding position (II.) which have been determined in this manner can be done by various methods.

Firstly, the new higher current value $I_{AUFBAU,NEU}$ defining the holding position (II.) which has been determined in the previous cycle, can be specified already in the following cycle, wherein a changeover from the holding position (II.) into the build-up position (I.) takes place, or the new lower current value $I_{ABBAU,NEU}$, respectively, defining the holding position, which has been determined in the previous cycle, can be specified already in the following cycle, wherein a changeover from the holding position (II.) into the relief position (III.) takes place, as the first manipulated variable, which has already been explained with reference to FIG. 4. In this way, a continuous and thus very dynamic adjustment to shifts of the working points $I_{AUFBAU}$ or $I_{ABBAU}$, respectively, due to interfering influences, is achieved.

Secondly, the current values $I_{AUFBAU,NEU}$ which have been determined for the changeover from the holding position (II.) into the build-up position (I.) or the current values $I_{ABBAU,NEU}$, respectively, which have been determined for the changeover from the holding position (II.) into the relief position (III.) can first be observed for a predetermined learning phase after entering a control, in order to specify the new higher or lower, respectively, current value $I_{AUFBAU,NEU}$, $I_{ABBAU,NEU}$ as the first manipulated variable only following this learning phase. Then, there are the options to either retain the new higher or lower, respectively, current value $I_{AUFBAU,NEU}$ $I_{ABBAU,NEU}$ defining the holding position (II.), which has been determined in the learning phase at the start of the control, unchanged until the end of the control as the first manipulated variable, or to have several learning phases executed successively during the control and to specify the new higher or lower, respectively, current value $I_{AUFBAU,NEU}$, $I_{ABBAU,NEU}$ determined thereby as the respective first manipulated variable. It is true that compared to the first mentioned method, a somewhat less dynamic adjustment to shifts of the working points $I_{AUFBAU}$ or $I_{ABBAU}$, respectively, due to interfering influences, takes place, however, possible inaccuracies in the determination of the current values $I_{AUFBAU,NEU}$, $I_{ABBAU,NEU}$, which are caused, for example, by interferences, are compensated.

Thirdly, provisions can be made that then when a control is not active or is terminated, respectively, the new higher or lower, respectively, current value $I_{AUFBAU,NEU}$, $I_{ABBAU,NEU}$ which was (last) determined during the previous control(s) is weighted in order to determine a higher or lower, respectively, current value as the initialisation value $I_{AUFBAU,INIT}$, $I_{ABBAU,INIT}$ for the next control. The initialisation value determined in this manner is then set in the first cycle of the following control.

The weighting can be effected, for example, in the form of a difference equation over a certain number of higher or lower, respectively, current values $I_{AUFBAU,NEU}$, $I_{ABBAU,NEU}$ of the previous controls. If, for example, the weighting is effected over 10 previous controls, with simply performing a mean value generation, then the higher or lower, respectively, current values $I_{AUFBAU,NEU}$, $I_{ABBAU,NEU}$ from the previous controls are weighted each by the factor 1/10.

$$I_{AUFBAU,INIT}=1/10*[I_{AUFBAU,NEU}^{(n)}+I_{AUFBAU,NEU}^{(n-1)}+ \ldots +I_{AUFBAU,NEU}^{(n-9)}],$$

or $$I_{ABBAU,INIT}=1/10*[I_{ABBAU,NEU}^{(n)}+I_{ABBAU,NEU}^{(n-1)}+ \ldots +I_{ABBAU,NEU}^{(n-9)}],$$

respectively.

However, it can also be provided to effect the weighting with different factors. If weighting is done, for example, over 2 previous controls in such a manner that the higher or lower, respectively, current value $I_{AUFBAU,NEU}$, $I_{ABBAU,NEU}$ from the last but one control is weighted by the factor 9/10, and the higher or lower, respectively, current values $I_{AUFBAU,NEU}$, $I_{ABBAU,NEU}$ from the last control is weighted by the factor 1/10.

$$I_{AUFBAU,INIT}=1/10*I_{AUFBAU,NEU}^{(n)}+9/10*I_{AUFBAU,NEU}^{(n-1)},$$

or $$I_{ABBAU,INIT}=1/10*I_{ABBAU,NEU}^{(n)}+9/10*I_{ABBAU,NEU}^{(n-1)},$$

respectively.

Due to the fact that the higher or lower, respectively, current value $I_{AUFBAU,NEU}$, $I_{ABBAU,NEU}$ from the last but one control is higher weighted than the higher or lower, respectively, current value $I_{AUFBAU,NEU}$, $I_{ABBAU,NEU}$ from the last control, the advantage is given that a unique "maverick" does not negatively influence the determination of the higher or lower, respectively, initialisation value $I_{AUFBAU,INIT}$, $I_{ABBAU,INIT}$, i.e. that a severe abrupt change of the higher or lower, respectively, initialisation value $I_{AUFBAU,INIT}$, $I_{ABBAU,INIT}$ is avoided.

Under practical conditions it has proven particularly advantageous to make the weighting during the first 10 controls with identical factors, i.e. 1/10, and then to go to a weighting covering 2 controls with two different weighting factors, i.e. for example, 9/10 and 1/10.

In order to achieve, in particular, that the frequency of the determination of new higher or lower, respectively, current values $I_{AUFBAU,NEU}$, $I_{ABBAU,NEU}$ does not exceed a certain degree, but also in order to compensate inaccuracies in the determination of the current values $I_{AUFBAU,NEU}$, $I_{ABBAU,NEU}$, it may be reasonable to carry out the inventive method only if one or several of the following conditions are met.

For example, the system, i.e. the electronically controllable brake booster, should be in a stable or at least almost stable operating condition, which can be concluded from variations of the actual signal $p_{IST}$. For this purpose, e.g. the bandpass filtered signal $P_{FILTER}$ can be evaluated. Accordingly, the inventive method would be carried out only if the signal amplitude of $P_{FILTER}$ lies within a predetermined acceptable range, i.e. $-P_{FILTER,MIN}<P_{FILTER}<+P_{FILTER,MAX}$.

Another condition could be that longer than desired build-up or relief cycles, respectively, are obtained in the control, is which principally, as already mentioned, results from the determination of the delay time T0,A, T0,B and the subsequent further processing of the new higher or lower, respectively, current values $I_{AUFBAU,NEU}$, $I_{ABBAU,NEU}$, defining the holding position (II.), which have been determined in this manner, by means of different weighting methods.

It can also be assumed that the standard deviation $X_D$ must be higher than a predetermined absolute value $|X_{D,MAX}|$ for the inventive method to be carried out. Under practical conditions, an absolute value $|X_{D,MAX}|$ in the order of 1 bar has proven advantageous.

Finally, the following advantages which are obtained in the inventive operation of the electronically controllable brake booster will be pointed out again.

On the one hand, the optimum determination of the working points $I_{AUFBAU}$ or $I_{ABBAU}$, respectively, results in shorter response times at each changeover from the holding position (II.) into the build-up position (I.) or into the relief position (III.), respectively, which improves the performance of the electronically controllable brake booster in its entirety rather significantly.

On the other hand, the learning capability enables the automatic detection and correction of shifts of the working points $I_{AUFBAU}$ or $I_{ABBAU}$, respectively, so that negative influences of long-term effects are eliminated. This is of importance, in particular, in the case of a replacement of the electronic control unit ECU or the brake booster 21, because subsequently thereto the correct working points $I_{AUFBAU}$ or $I_{ABBAU}$, respectively, can be adjusted automatically.

In addition, it is understood that the inventive operation of the electronically controllable brake booster with respect to noise generation and accuracy is performed particularly comfortable.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electronically controllable brake booster with
   a vacuum chamber and a pressure chambers which are separated from each other by a movable wall,
   a control valve arrangement which can be actuated by means of an electromagnetic actuation means, and by means of which a pressure difference between the pressure chamber and the vacuum chamber can be adjusted, with
   the control valve arrangement, as a function of a current flowing through the electromagnetic actuation means, assuming a holding position in which the current ranges between a higher value and a lower value without the control valve arrangement leaving the holding position,
   a first pressure changing position in which the current is higher than the higher value, and
   a second pressure changing position in which the current is lower than the low value, characterised in that
      upon a changeover from the holding position into the first or the second pressure changing position, or upon a changeover from the first or the second pressure changing position into the holding position, the time period is determined which is required for the changeover,
      the determined time period is compared with a predetermined time interval in order to determine whether the changeover has taken place within this predetermined time interval, and at least one of the higher and lower current value defining the holding position is modified for future changeovers if the determined time period exceeds the predetermined time interval.

2. The electronically controllable brake booster according to claim 1, characterised in that
   at least one of the higher current value defining the holding position is increased and the lower current value defining the holding position is decreased.

3. The electronically controllable brake booster according to claim 1, characterised in that
   the new higher current value defining the holding position which has been determined in the previous changeover cycle(s), can be specified already in the following changeover cycle, wherein a changeover from the holding position into the build-up position takes place, or the new lower current value, respectively, defining the holding position, which has been determined in the previous changeover cycle, can be specified already in the following changeover cycle, wherein a changeover from the holding position into the relief position takes place, as the first manipulated variable.

4. The electronically controllable brake booster according to claim 1, characterised in that
   upon entering a control phase, the higher current values determined for the changeover from the holding position into the first pressure changing position, or the lower current values, respectively, determined for the changeover from the holding position into the second pressure changing position are first compared with predetermined possible change profiles for a predetermined learning phase in order to specify the new higher or lower, respectively, current value defining the holding position only subsequently to this learning phase as the first manipulated variable.

5. The electronically controllable brake booster according to claim 4, characterised in that
   the new higher or lower, respectively, current value defining the holding position, which has been determined in the learning phase, is retained unchanged until the end of the respective control phase.

6. The electronically controllable brake booster according to claim 4, characterised in that
   the new higher or lower, respectively, current value which was determined during a control phase is weighted by the higher or lower, respectively, current value(s) which has/have been determined during one or several previous control(s) as the initialisation value for a subsequent control phase.

7. The electronically controllable brake booster according to claim 5, characterised in that
   the first pressure changing position is a pressure build-up position, and
   the second pressure changing is a pressure relief position.

* * * * *

UNITED STATES PATENT AND TRADEMARK OFFICE
CERTIFICATE OF CORRECTION

PATENT NO. : 6,357,837 B1 Page 1 of 1
DATED : March 19, 2002
INVENTOR(S) : Christoph Linden et al.

It is certified that error appears in the above-identified patent and that said Letters Patent is hereby corrected as shown below:

Column 10,
Line 60, after "changing" insert -- position --.

Signed and Sealed this

Twenty-seventh Day of August, 2002

Attest:

Attesting Officer

JAMES E. ROGAN
Director of the United States Patent and Trademark Office